United States Patent
Guruparan et al.

[11] Patent Number: 6,141,551
[45] Date of Patent: Oct. 31, 2000

[54] METHOD OF AND A SYSTEM FOR MANAGING COMMUNICATIONS

[75] Inventors: Corattur Natesan Sambandam Guruparan, Cary; Eric Douglas Romesburg, Chapel Hill, both of N.C.

[73] Assignee: Ericsson Inc., Research Triangle Park, N.C.

[21] Appl. No.: 09/024,176

[22] Filed: Feb. 17, 1998

[51] Int. Cl.[7] .................................................. H04B 7/00
[52] U.S. Cl. ........................... 455/434; 455/435; 455/458
[58] Field of Search ................................... 455/422, 432, 455/433, 434, 435, 550, 551, 575, 458

[56] References Cited

U.S. PATENT DOCUMENTS

| | | | |
|---|---|---|---|
| 4,905,301 | 2/1990 | Krolopp et al. | |
| 5,442,806 | 8/1995 | Barber et al. | |
| 5,734,980 | 3/1998 | Hooper et al. | |
| 5,905,955 | 5/1999 | Bamburak et al. | 455/434 |

*Primary Examiner*—Thanh Cong Le
*Attorney, Agent, or Firm*—Wood, Phillips, VanSanten, Clark & Mortimer

[57] ABSTRACT

A mobile communications device is selectively in communication with a radio telecommunications system having an authorized service provider and an unauthorized service provider, each service provider with a control channel associated therewith. A method for managing the communication between the device and the system involves the steps of (a) detecting control channels received by the mobile communications device, (b) determining whether the control channels received by the mobile communications device are associated with an authorized or an unauthorized service provider, (c) storing an authorization code representative of whether the control channels received by the mobile communications devices are associated with an authorized or an unauthorized service provider, (d) in response to receiving a request to initiate communication between the mobile communications device and the radio telecommunications system, selecting one of the control channels received by the mobile communications device to initiate communication between the mobile communications device and the radio telecommunications system, (e) determining the authorization code associated with the one of the control channels, and (f) enabling communication between the mobile communications device and the radio telecommunications system only if the authorization code associated with the one of the control channels is associated with an authorized service provider.

16 Claims, 3 Drawing Sheets

METHOD OF AND A SYSTEM FOR MANAGING COMMUNICATIONS

FIELD OF THE INVENTION

The present invention is directed to a method of, and a system for, managing communications between a radio telecommunications system and a mobile communications device, and in particular a method of, and a system for, managing communications wherein the mobile communications device determines which control channel, if any, received by the mobile communications device is associated with an authorized service provider before communication is initiated between the radio telecommunications system and the mobile communications device.

BACKGROUND OF THE INVENTION

It is known in the art to have a mobile station or mobile communications device in radio telecommunication with a radio telecommunications system having a plurality of system operators or service providers. Each of the service providers operates one or more networks, each network including a plurality of base stations. Each base station has one or more control channels on which control information is exchanged and one or more voice channels on which voice messages may be passed back and forth between the base station and the mobile station.

Conventionally, one of the service providers has agreed to provide the user of the mobile communications device with radio telecommunications services in accordance with a specific fee schedule. This service provider may be referred to as the home service provider, the base stations operated by this service provider may be referred to as the home base stations, and the areas covered by the home base stations may be referred to collectively as the home service provider coverage area. When the mobile station is in radio telecommunication with the home base stations, the cost of the telecommunication services is calculated according to the agreed fee schedule.

It is also common for the user of the mobile station to move the mobile station to a point outside of the home service provider coverage area into the coverage area of another service provider. If the mobile station is used to communicate with a base station of the other service provider, however, the other service provider typically assesses charges in addition to the charges provided for in the above-mentioned fee schedule for the use of its network by mobile stations which do not have service agreements with it. These charges are commonly referred to as roaming charges.

Because the user of the mobile station may not be immediately aware of the amount of such roaming charges, many users would prefer to forego sending or receiving any radio telecommunications messages while in another service provider's coverage area. Many mobile stations provide the user with a visual indication on an output device associated with the mobile station representative of the fact that the mobile station has been moved outside the home service provider coverage area. However, this requires the user to pay particular attention to the visual display before initiating communication with the radio telecommunication system.

Moreover, at the boundaries of the home service provider coverage area, signals may be received by the mobile station from base stations of both the home service provider and other service providers. Given varying signal strengths along these border coverage areas, the strongest signal may continuously change between the home service provider and other service providers. This may make it even more difficult for the user of the mobile station to ensure that only home base stations are being used for the transmission and reception of radio telecommunications messages.

SUMMARY OF THE INVENTION

According to an aspect of the present invention, a method is provided for managing communication between a mobile communications device and a radio telecommunications system having an authorized service provider and an unauthorized service provider. Each service provider has control channels associated therewith. The method involves the steps of detecting control channels received by the mobile communications device and determining whether the control channels received by the mobile communications device are associated with an authorized or an unauthorized service provider. An authorization code representative of whether the control channels received by the mobile communications devices are associated with an authorized or an unauthorized service provider is stored. Receiving a request to initiate communication between the mobile communications device and the radio telecommunications system, the method involves the steps of selecting one of the control channels received by the mobile communications device to initiate communication between the mobile communications device and the radio telecommunications system, and determining the authorization code associated with the one of the control channels. Communication is enabled between the mobile communications device and the radio telecommunications system only if the authorization code associated with the one of the control channels is associated with an authorized service provider.

Moreover, each control channel may have an identification code associated therewith, and the mobile communications device may have a memory in which are stored identification codes of an authorized service provider and an unauthorized service provider. In this case, the method may include the step of detecting the identification code of the control channels received by the mobile communications device. In addition, the step of determining whether the control channels are associated with an authorized or an unauthorized service provider may include the steps of retrieving the identification codes from the mobile communications device memory, and comparing the stored identification codes with the detected identification codes.

Moreover, the step of enabling communication between the mobile communications device and the radio telecommunications system may include the steps of sending a request for a voice channel on the one of the control channels only if the authorization code associated with the one of the control channels is associated with an authorized service provider, and in response to a voice channel allocation message from the authorized service provider, sending a message on an allocated voice channel to the authorized service provider.

Moreover, the step of selecting one of the control channels may include the steps of determining which of the control channels received by the mobile communications device is the strongest channel, and preliminarily selecting the strongest control channel to initiate communication between the mobile communications device and the radio telecommunications system.

Moreover, the method may include the step of selecting another one of the control channels received by the mobile communications device to initiate communication between the mobile communications device and the radio telecommunications system if the authorization code associated with the one of the control channels is associated with an unauthorized service provider.

Moreover, the method may include the step of determining if a message management enable signal has been received by the mobile communications device, and the step of enabling communication between the mobile communications device and the radio telecommunications system may include the step of enabling communication between the mobile communications device and the radio telecommunications device only if the authorization code associated with the one of the control channels is associated with an authorized service provider and the message management signal enable has been received. Further, the method may include the step of enabling communication between the mobile communications device and the radio telecommunications system regardless of whether the control channel is associated with an authorized or an unauthorized service provider if the message management enable signal has not been received by the mobile communications device.

Moreover, the steps of detecting the control channels, determining whether the control channels are associated with an authorized or an unauthorized service provider and storing the authorization code may be repeated until a request to initiate communication between the mobile communications device and the radio telecommunications system is received. Further, the steps of detecting the control channels, determining whether the control channels are associated with an authorized or an unauthorized service provider and storing the authorization code may be repeated at a predetermined rate until a request to initiate communication between the mobile communications device and the radio telecommunications system is received. Still further, the predetermined rate may be one repetition every 10 to 15 seconds.

According to another aspect of the present invention, a method is provided for managing communication between a mobile communications device and a radio telecommunications system having an authorized service provider and an unauthorized service provider. Each service provider has a control channel associated therewith and each control channel has a frequency associated therewith. The method involves the steps of detecting the frequency of control channels received by the mobile communications device and determining whether the control channels received by the mobile communications device are associated with an authorized or an unauthorized service provider. The frequencies of the control channels received by the mobile communications device and an authorization code representative of whether the control channels received by the mobile communications devices are associated with an authorized or an unauthorized service provider are stored. Receiving a request to initiate communication between the mobile communications device and the radio telecommunications system, the method involves the steps of selecting one of the control channels received by the mobile communications device to initiate communication between the mobile communications device and the radio telecommunications system, detecting the frequency of the one of the control channels, and determining the authorization code associated with the detected frequency of the one of the control channels. Communication is enabled between the mobile communications device and the radio telecommunications system only if the authorization code associated with the detected frequency of the one of the control channels is associated with an authorized service provider.

According to further aspect of the present invention, a mobile communications device is provided for use with a radio telecommunications system with an authorized service provider and an unauthorized service provider. Each service provider has control channels associated therewith. The mobile communications device has a transmitter/receiver to transmit messages to and receive messages from a radio telecommunications system, a memory selectively coupleable to the transmitter/receiver, and a programmable computational apparatus selectively coupleable to the transmitter/receiver and the memory. A program operates in the programmable computational apparatus to control the programmable computational apparatus (a) to detect control channels received by the mobile communications device, (b) to determine whether the control channels received by the mobile communications device are associated with an authorized or an unauthorized service provider, and (c) to store an authorization code representative of whether the control channels received by the mobile communications devices are associated with an authorized or an unauthorized service provider. The program also operates in the programmable computational apparatus to control the programmable computational apparatus (d) in response to a request to initiate communication between the mobile communications device and the radio telecommunications system, to select one of the control channels received by the mobile communications device to initiate communication between the mobile communications device and the radio telecommunications system, (e) to determine the authorization code associated with the one of the control channels, and (f) to enable communication between the mobile communications device and the radio telecommunications system only if the authorization code associated with the one of the control channels is associated with an authorized service provider.

Moreover, each control channel may have an identification code associated therewith. In such case, the memory may have a site in which identification codes are stored for an authorized service provider and an unauthorized service provider, and the first program may operate in the programmable computational apparatus to control the programmable computational apparatus to detect the identification code of the control channels received by the mobile communications device, and, in determining whether the control channels received by the mobile communications device are associated with an authorized or an unauthorized service provider, to compare the stored identification codes with the detected identification codes.

Moreover, the first program may operate in the programmable computational apparatus to control the programmable computational apparatus, in enabling communication between the mobile communications device and the radio telecommunications system, to control the transmitter/receiver to send a request for a voice channel on the one of the control channels only if the authorization code associated with the one of the control channels is associated with an authorized service provider, and, in response to a voice channel allocation message from an authorized service provider, to control the transmitter/receiver to send a message on an allocated voice channel to the authorized service provider.

Moreover, the mobile communications device may further include an input/output assembly selectively coupleable to the programmable computational apparatus to provide a first program disable signal. The mobile communications device may also further include a second program operating in the programmable computational apparatus to control the programmable computational apparatus in the alternative to the first program in response to the input/output assembly providing the first program disable signal to the programmable computational device, the second program operating in the programmable computational apparatus to control the programmable computational apparatus (a) in response to a request to initiate communication between the mobile communication device and the radio telecommunication system, to select one of the control channels received by the mobile communication device to initiate communication between the mobile communications device and the radio telecommunications system, and (b) to enable communication between the mobile communications device and the radio telecommunications system regardless of whether the control channel is associated with an authorized or an unauthorized service provider.

Moreover, the mobile communications device may further include an input/output assembly selectively coupleable to the programmable computational apparatus to display a message to a user of the mobile communications device. In this case, the first program may operate the programmable computational apparatus to control the programmable computational apparatus to provide an origination request failed message to the input/output assembly to be displayed thereon only if communication is not enabled between the mobile communications device and the radio telecommunications system.

DETAILED DESCRIPTION OF THE PREFERRED EMBODIMENT

Figure 1:
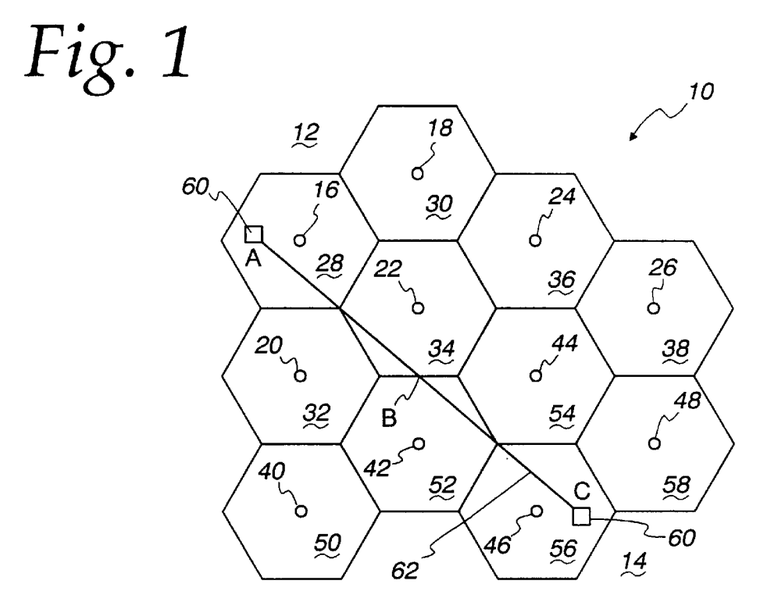
FIG. 1 is a schematic representation of a radio telecommunications system including an authorized (or home) service provider and an unauthorized (or other) service provider, each service provider having a plurality of base stations and each base station having its own coverage area, and a mobile communications device moving from a point within the coverage area of one of the base stations of the home service provider to a point within the coverage area of one of the base stations of the other service provider.

An exemplary conventional radio telecommunications system 10 is shown in FIG. 1. The radio telecommunications system 10 includes an authorized (or home) system operator 12 and an unauthorized (or other) system operator 14. The home system operator 12 has base stations 16, 18, 20, 22, 24, 26 with coverage areas 28, 30, 32, 34, 36, 38. The other system operator 14 has base stations 40, 42, 44, 46, 48 with coverage areas 50, 52, 54, 56, 58.

Each of the base stations 16, 18, 20, 22, 24, 26, 40, 42, 44, 46, 48 has at least one control channel associated therewith, the control channel having a frequency represented by F16, F18, F20, F22, F24, F26, F40, F42, F44, F46, F48, respectively, and one or more voice channels. Alternatively, each coverage area could be divided into three sectors, each sector with its own control channel, as is known in the art. To simplify the discussion, however, a non-sectored arrangement is described herein, but the method and system are equally applicable to such a sectored arrangement.

A mobile station or mobile communications device 60 is also shown in FIG. 1 moving along a path indicated by a line 62. The mobile communications device 60 starts within the home service provider coverage area at a point A, passes from the home service provider coverage area to the other service provider coverage area at a point B, and ends within the other service provider coverage area at a point C.

Figure 2:
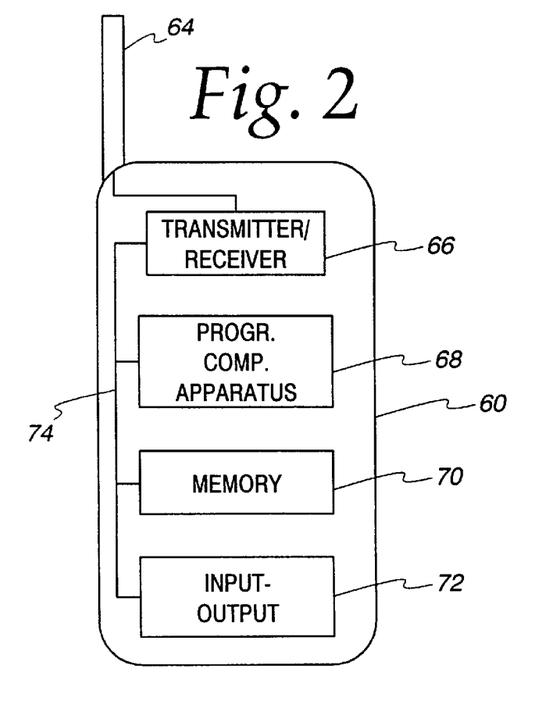
FIG. 2 is a block diagram of a mobile communications device useful in implementing the method and system according to the present invention.

The mobile communications device 60 is shown in FIG. 2. The mobile communications device 60 includes an antenna 64, a transmitter/receiver 66, a programmable computational apparatus 68, a memory 70, an input/output assembly 72, and a data bus 74 for passing signals between the transmitter/receiver 66, the programmable computational apparatus 68, the memory 70 and the input/output assembly 72. A communications management program operates in the programmable computational apparatus 68 for managing communications between the mobile communications device 60 and the radio telecommunications system 10 as will be explained in greater detail below.

Figure 3:
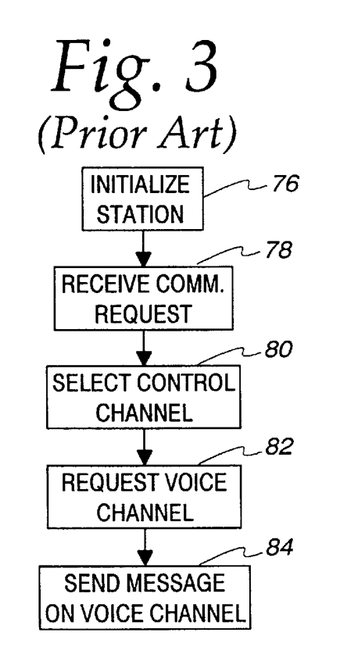
FIG. 3 is a flow chart illustrating the prior art method of managing communications between a radio telecommunications system and a mobile communications device.

The conventional operation of a mobile communications device in radio telecommunications with the radio telecommunications system 10 is shown in FIG. 3. At a block 76, the mobile communications device 60 is initialized upon activation by the user. At a block 78, the mobile communications device receives a signal (origination signal) from the user to initiate communications with the radio telecommunications system 10. In response to the origination signal, the mobile communications device 60 selects a control channel from among those being received by the mobile communications device at a block 80. Conventionally, the selected control channel is the strongest control channel, irrespective of whether the control channel is associated with one of the home base stations 16, 18, 20, 22, 24, 26 or one of the other base stations 40, 42, 44, 46, 48. At a block 82, the mobile communications device sends an origination request message on the selected control channel for access to a voice channel associated with the base station. In response to receipt of a voice channel allocation message from the base station on the control channel, at a block 84, communication takes place between the mobile communications device and the radio telecommunications system 10 on the allocated voice channel.

According to the present invention, the program operating in the programmable computational device 68 operates the programmable computational device 68 to detect the control channels received by the mobile communications device 60. The program then operates the programmable computational device 68 to determine whether the control channels received are associated with the home service provider 12 or the other service provider 14. This information may be stored locally, preferably in tabular form, in the memory 70. Upon receipt of an origination signal from the input/output assembly 72 to initiate communication between the mobile communications device 60 and the radio telecommunications system 10 (i.e. to initiate a communication session), the programmable communications device 68 selects a control channel, retrieves the information stored in the memory 70 to determine whether the control channel is associated with the home or other service provider 12, 14, and then enables communication between the mobile communications device 60 and the radio telecommunications network 10 only if the control channel is associated with one of the base stations 16, 18, 20, 22, 24, 26 of the home service provider 12. For example, at the point C, the only available control channels may be of the other service provider base stations 40, 42, 44, 46, 48, and the program may prevent communications from being enabled between the mobile communications device 60 and the base stations 40, 42, 44, 46, 48.

The method and operation of the system according to the present invention is now discussed in greater detail with reference to FIGS. 4 & 5. Upon activation of the mobile communications device 60, an initialization routine is performed at a block 88 to prepare the mobile communications device 60 for communication with the radio telecommunications system 10. At a block 90, the programmable computational apparatus 68 determines whether the communications management program has been activated.

If the communications management program has not been activated, then at a block 92, the programmable computational apparatus 68 determines if an origination signal representative of a request to initiate communication with the radio telecommunications system 10 (i.e. to initiate a communication session) has been received. If such a signal has been received, then the programmable computational apparatus 68 selects a control channel from among those control channels received by the mobile communications device 60 at a block 94. The programmable computational apparatus 68 transmits an origination request message at a block 96 for a voice channel from among the voice channels associated with the selected control channel, and at a block 98, in response to a message allocating one of the voice channels, transmits a message on the one of the voice channels. On termination of the session, the program may then return to the block 90, after possible initialization of memory, to determine if the communications management program has been activated.

If, at the block 90, it is determined that the communications management program has been activated, then the programmable computational apparatus 68 controls the transmitter/receiver 66 to detect the control channels received by the mobile communications device 60 at a block 100. As is known in the art, each control channel has a specific frequency and unique identification codes associated therewith which identify the control channel as being associated with a specific service provider. One such identification code associated with the control channels is the system identification code (SID). Both the frequency and/or the unique identification codes may be detected at a block 102.

After detecting the frequency and the identification codes associated with the control channels (block 102), the programmable computational apparatus 68 retrieves information on the identification codes associated with the home and other service providers 12, 14 from the memory 70 at a block 104. Also at the block 104, the programmable computational apparatus 68 compares the identification codes stored in the memory 70 with the identification codes associated with the control channels detected to determine which control channels, if any, are associated with the home service provider 12 and which are associated with the other service provider 14. Each frequency of each control channel is then assigned an authorization code at the block 106 which is representative of whether the control channel is associated with the home service provider 12 or the other service provider 14. The frequencies and authorization codes are stored locally in the memory 70 for future reference at a block 108.

At a block 110, the programmable computational apparatus 68 determines whether an origination signal representative of a request to initiate communication with the radio telecommunication system 10 (i.e. to initiate a communication session) has been received. If the origination signal has not been received, the program returns to the block 90, and repeats the steps 100, 102, 104, 106, 108 at a predetermined rate, for example every 10–15 seconds. If the origination signal has been received, then the program proceeds to a block 112 (FIG. 5).

At the block 112, the programmable computational apparatus 68 preliminarily selects one of the control channels received by the mobile communications device 60. At a block 114, the programmable computational apparatus 68 detects the frequency of the control channel selected. Given the frequency of the control channel known, the programmable computational apparatus 68 retrieves from the memory 70 the authorization code associated with that frequency at a block 116.

At a block 118, the programmable computational apparatus 68 determines whether the authorization code retrieved from the memory 70 identifies the control channel as being associated with the one of the base stations of the home service provider 12 or the other service provider 14. If the determination is made that the authorization code identifies the control channel as being associated with one of the base stations 16, 18, 20, 22, 24, 26 of the home service provider 12, then the programmable computational apparatus 68 controls the transmitter/receiver 66 to send an origination request message for a voice channel at a block 120, and, in response to a message on the control channel allocating one of the voice channels associated with the control channel, to send the voice message at a block 122.

If, however, it is determined at the block 118 that the authorization code does not identify one of the base stations 16, 18, 20, 22, 24, 26 of the home service provider 12, then at a block 124 the programmable computational apparatus 68 determines if all of the control channels received by the mobile communications device 60 have been selected and examined. If it is determined that not all of the control channels received by the mobile communications device 60 have been selected and examined, then the program returns to the block 112, whereupon the programmable computational apparatus 68 selects another of the control channels received by the mobile communications device 60. If it is determined at the block 124 that all of the control channels have been selected and examined, then at a block 126 the programmable computational apparatus provides an origination request failed message to the input/output assembly 72 via the data bus 74 to be displayed indicating that the origination request message could not be sent because the mobile communications device had been moved outside of the home coverage area.

The operation of the mobile communications device 60 is now discussed with reference to FIGS. 1, 4, and 5 with the communications management program being activated and the mobile communications device 60 being moved along the path 62 from the point A to the point C via the point B. The service provider 12 is designated as the home service provider, while the service provider 14 is designated as the other service provider.

At point A, the user activates the mobile communications device 60, whereupon the program operating in the programmable computational apparatus 68 operates the programmable computational apparatus 68 to initialize the mobile communications device 60 preparatory to communication with the radio telecommunications system 10 (block 88). The programmable computational apparatus 68 then determines that the communications management program has been activated at the block 90.

Figure 4:
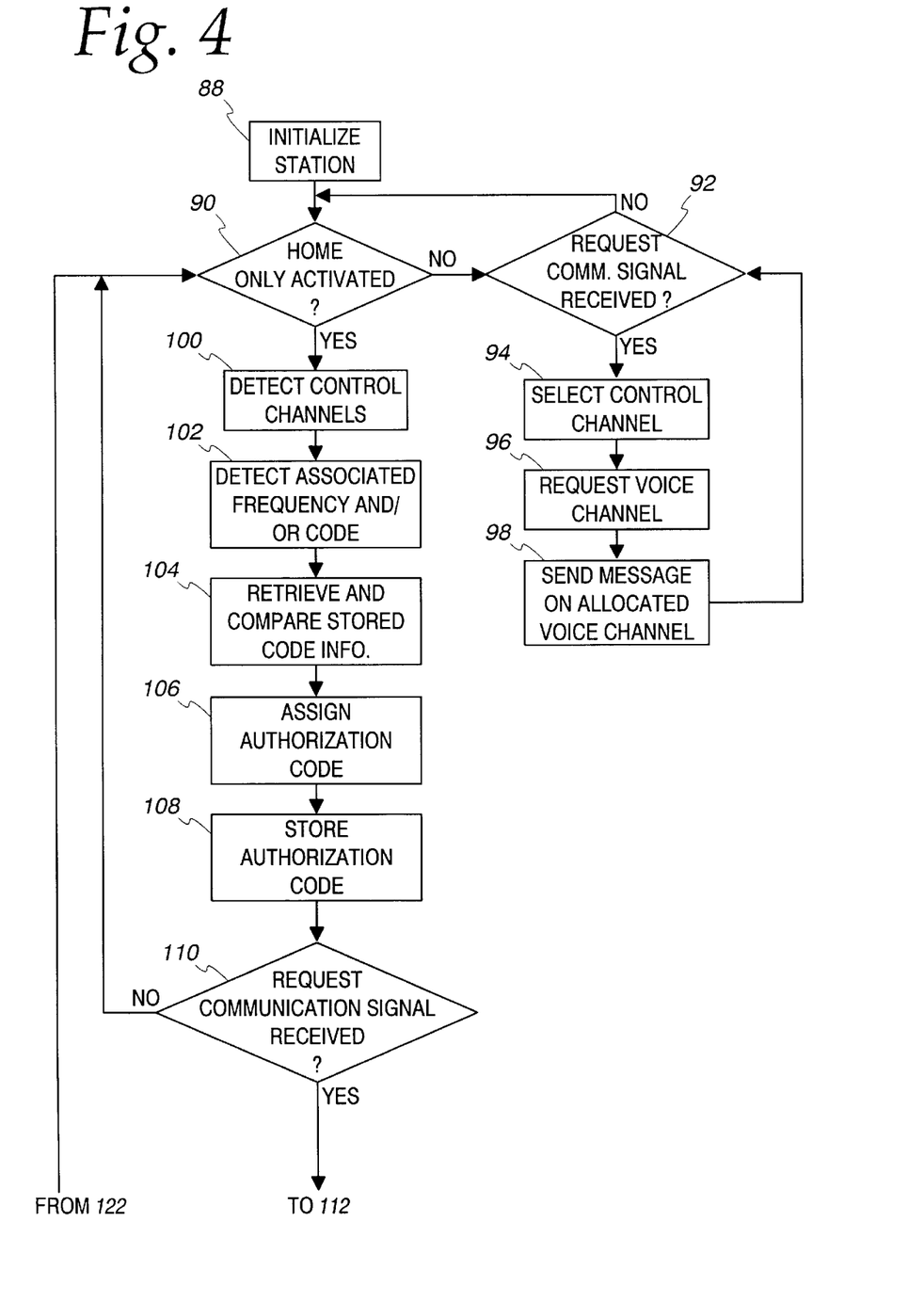
FIGS. 4 & 5 is a flow chart illustrating the method of managing communications between a radio telecommunications system and a mobile communications device according to the present invention.
Figure 5:
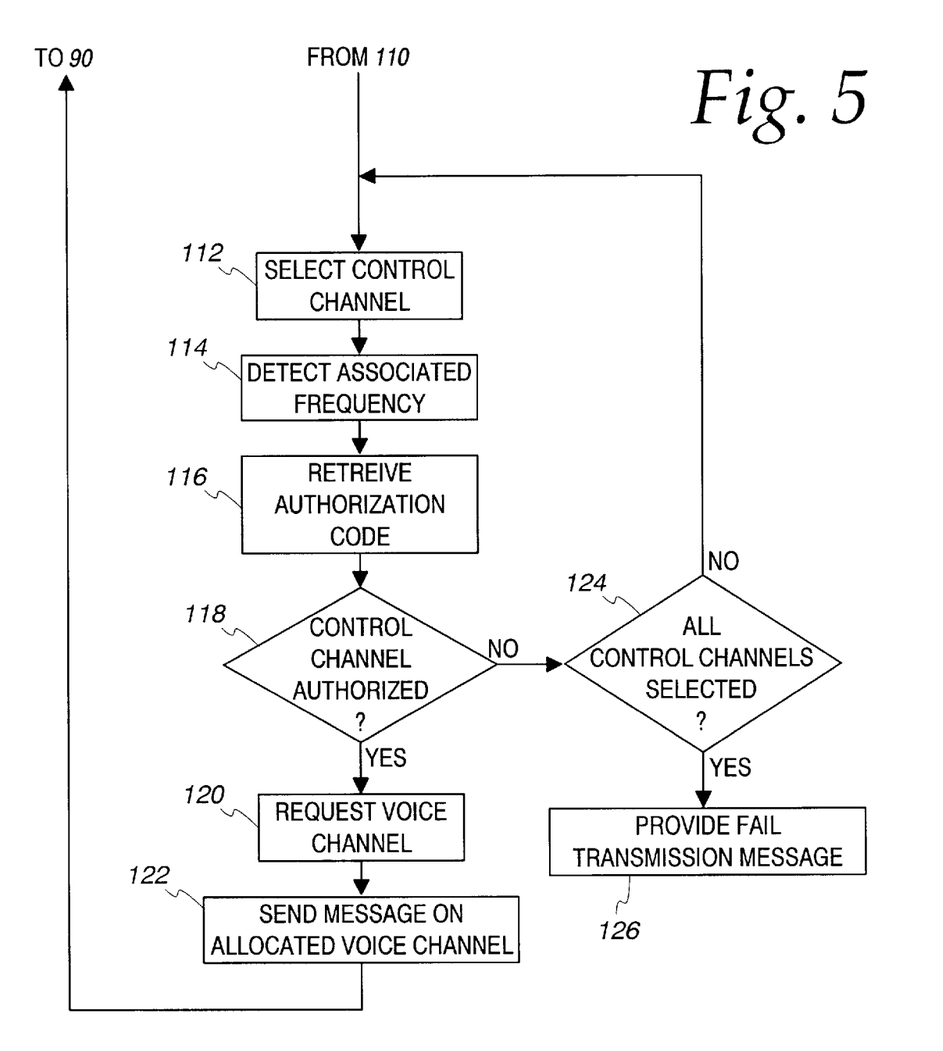

In accordance with the program as illustrated in FIGS. 4 & 5, the programmable computational apparatus 68 detects the control channels (block 100) and detects the frequencies and identification codes associated therewith (block 102).

The programmable computational apparatus 68 then retrieves the information regarding the identification codes of home and other service providers from the memory 70 at the block 104. The programmable computational apparatus 68 then compares the detected and stored identification codes to determine which of the control channels detected at the block 100 are associated with the home service provider 12. An authorization code is assigned to each frequency detected, with the code indicating whether the control channel is associated with the home service provider 12 or the roam service provider 14. The frequencies and associated authorization codes are then stored locally into the memory 70 at the block 108. An exemplary set of the frequencies detected at the point A and authorization codes assigned thereto is provided in Table 1:

TABLE 1

| FREQUENCY | AUTHORIZATION CODE |
|---|---|
| F16 | HOME |
| F18 | HOME |
| F20 | HOME |
| F22 | HOME |

If the user of the mobile communications device 60 desires to initiate a communication with the radio telecommunications system 10 (i.e. to initiate a communication session) at the point A, then at the block 110 the programmable computational apparatus 68 would determine that the origination signal had been received from the input/output assembly 72. At the block 112, the programmable computational apparatus 68 preliminarily selects the strongest control channel received by the mobile communications device 60. The programmable computational device 68 then detects at the block 114 the frequency associated with the selected control channel. At the block 116, the programmable computational apparatus 68 preliminarily retrieves the authorization code associated with the frequency of the control channel selected. At the block 118, because all of the frequencies are associated with base stations of the home service provider 12, the programmable computational apparatus 68 determines that the authorization code associated therewith identifies the frequency as being associated with the home service provider 12. As such, at the block 120, a voice channel is requested on the control channel, and, in response to a voice channel allocation message received from the base station, at the block 122 a communication session is initiated on the allocated voice channel to the radio telecommunications system 10.

As the mobile communications device 60, without having initiated a communication session, is moved from the point A to the point B, the programmable computational apparatus 68 periodically performs the steps of detecting the control channels (block 100), detecting the frequency and identification codes associated therewith (block 102), retrieving the identification code information for home and other service providers from the memory 70 (block 104), determining the authorization codes (block 106), and storing the frequencies and authorization codes in the memory 70 (block 108). These steps are repeated at a predetermined rate, every 10–15 seconds for example, or until it is determined at the block 110 that an origination signal is received from the input/output assembly 72. At the point B, the table of frequencies and authorization codes may appear as shown in Table 2:

TABLE 2

| FREQUENCY | AUTHORIZATION CODE |
|---|---|
| F20 | HOME |
| F22 | HOME |
| F42 | ROAM |
| F44 | ROAM |

If the user of the mobile communications device 60 desires to initiate communication between the mobile communications device 60 and the radio telecommunications system 10 (i.e. to initiate a communication session) at the point B, then in response to the origination signal (block 110), the programmable computational device 68 preliminarily selects one of the control channels received by the mobile communications device 60 (block 112). The programmable computational apparatus 68 then detects the frequency of the selected control channel at the block 114, and retrieves the authorization code associated therewith at the block 116 from the memory 70.

The programmable computational apparatus 68 then determines at the block 118 if the authorization code identifies the control channel as being associated with the home service provider 12 or the other service provider 14. Unlike at point A, where all of the control channels were associated with base stations 18, 20, 22, 24 of the home service provider 12, at the point B some of the control channels are associated with the home service provider 12, while others are not. As a consequence, depending on which control channel is strongest, the programmable computational apparatus 68 may have to select more than one control channel before a control channel associated with the home service provider 12 is confirmed at the block 118.

For example, the control channels associated with the frequencies F42 and F44 may be stronger than the control channels associated with the frequencies F20 or F22, while all four channels may be strong enough to support communications between the mobile communications device 60 and the radio telecommunications system 10. As a consequence, the programmable computational device 68 would first select the control channel associated with the frequency F42, for example, at the block 112, detect its frequency (F42) at the block 114, retrieve the associated authorization code at the block 116, and then determine at the block 118 that the authorization code is not associated with the home service provider 12. As a further consequence, the programmable computational device 68 would determine at the block 124 that not all of the control channels had been selected, and would proceed to select the control channel with the next strongest signal, the control channel associated with the frequency F44 for example.

As the control channel associated with the frequency F44 is also associated with the other service provider 14, the programmable computational apparatus 68 would again perform the steps listed in the blocks 112, 114, 116, 118 and 124. Upon selecting a still other control channel, the control channel associated with the frequency F22 for example, the programmable computational device 68 would determine at the block 118 that the authorization code retrieved at the block 116 identifies the control channel associated with the frequency F22 as associated with the base station 22 of the home service provider 12. Consequently, the programmable computational apparatus 68 would finally perform the operations necessary to send the message at the blocks 120, 122.

As the mobile communications device 60 moves from the point B to the point C, again without initiating a communication session, the programmable computational device 68 would again perform the steps 100, 102, 104, 106, 108 at the predetermined rate until an origination signal is received at the block 110. At the point C, the table of frequencies and authorization codes may appear as in Table 3:

TABLE 3

| FREQUENCY | AUTHORIZATION CODE |
|---|---|
| F42 | ROAM |
| F44 | ROAM |
| F46 | ROAM |
| F48 | ROAM |

As a consequence, when the programmable computational apparatus 68 selects the control channel (block 112), detects the frequency associated therewith (block 114), retrieves the authorization code associated with the frequency (block 116) and determines whether the authorization code is associated with the home service provider (block 118), the programmable computational apparatus 68 will always determine, regardless of the control channel, that the control channel is not associated with the base stations 16, 18, 20, 22, 24, 26 of the home service provider 12. As a further consequence, after selecting all control channels (i.e. the control channels associated with frequencies F42, F44, F46 F48), the programmable computational apparatus 68 will determine at the block 124 that all of the control channels have been selected and examined. Therefore, at the block 126, the programmable computational apparatus 68 generates an origination request failed message to be displayed on the input/output assembly 72 representative of the fact that the origination request message cannot be sent because none of the control channels available for communication with the radio telecommunications system 10 is associated with the home service provider 12.

Alternatively, at any point along the path 62 from the point A to the point C, the user of the mobile communications device 60 may deactivate the communications management program via a signal provided to the programmable computational apparatus 68 by the input/output assembly 72 via the data bus 74. If the communication management program is deactivated, then rather than performing the steps 100–126, the mobile communications device 60 will send a message on the strongest control channel, whether it is identified with the home service provider 12 or not. As illustrated in FIG. 4, if the mobile communications device 60 determines at the block 92 that an origination signal has been provided to the programmable computational apparatus 68, then the programmable computational apparatus 68 selects a control channel (block 94) and initiates a communication session (blocks 96, 98). At the end of that session, the program returns to the block 90, after some possible housekeeping and/or initialization, to determine whether in the meantime the communications management program has been activated (or reactivated) by the user of the mobile communications device 60.

By using the method of and system for managing communications according to the present invention, the users of mobile communications devices may be freed of the task of determining whether the mobile communications device is within another service provider's coverage area such that roaming charges will be assessed. Instead, the mobile communications device prevents all communications between the mobile communications device and the radio telecommunications system except via base stations of the home service provider.

Still other aspects, objects, and advantages of the present invention can be obtained from a study of the specification, the drawings, and the appended claims.

We claim:

1. A method for managing communication between a mobile communications device and a radio telecommunications system having an authorized service provider and an unauthorized service provider, each service provider having a control channel associated therewith, the method comprising the steps of:

detecting control channels received by the mobile communications device;

determining whether the control channels received by the mobile communications device are associated with an authorized or an unauthorized service provider;

storing an authorization code representative of whether the control channels received by the mobile communications devices are associated with an authorized or an unauthorized service provider;

receiving a request to initiate communication between the mobile communications device and the radio telecommunications system;

selecting one of the control channels received by the mobile communications device to initiate communication between the mobile communications device and the radio telecommunications system;

determining the authorization code associated with the one of the control channels; and enabling communication between the mobile communications device and the radio telecommunications system only if the authorization code associated with the one of the control channels is associated with an authorized service provider.

2. The method according to claim 1, each control channel having an identification code associated therewith and the mobile communications device having a memory in which is stored identification codes of an authorized service provider and an unauthorized service provider, the method further comprising the step of detecting the identification code of the control channels received by the mobile communications device, and wherein the step of determining whether the control channels are associated with an authorized or an unauthorized service provider comprises the steps of retrieving the identification codes from the mobile communications device memory and comparing the stored identification codes with the detected identification codes.

3. The method according to claim 1, wherein the step of enabling communication between the mobile communications device and the radio telecommunications system comprises the steps of:

sending a request for a voice channel on the one of the control channels only if the authorization code associated with the one of the control channels is associated with an authorized service provider; and in response to a voice channel allocation message from the authorized service provider, sending a message on an allocated voice channel to the authorized service provider.

4. The method according to claim 1, wherein the step of selecting one of the control channels comprises the steps of:

determining which of the control channels received by the mobile communications device is the strongest channel; and preliminarily selecting the strongest control channel to initiate communication between the mobile communications device and the radio telecommunications system.

5. The method according to claim 1, further comprising the step of selecting another one of the control channels received by the mobile communications device to initiate communication between the mobile communications device and the radio telecommunications system if the authorization code associated with the one of the control channels is associated with an unauthorized service provider.

6. The method according to claim 1, further comprising the step of determining if a message management enable signal has been received by the mobile communications device, wherein the step of enabling communication between the mobile communications device and the radio telecommunications system comprises the step of enabling communication between the mobile communications device and the radio telecommunications device only if the authorization code associated with the one of the control channels is associated with an authorized service provider and the message management enable signal has been received by the mobile communications device.

7. The method according to claim 6, the method further comprising the step of enabling communication between the mobile communications device and the radio telecommunications system regardless of whether the control channel is associated with an authorized or an unauthorized service provider if the message management enable signal has not been received.

8. The method according to claim 1, wherein the steps of detecting the control channels, determining whether the control channels are associated with an authorized or an unauthorized service provider and storing the authorization code are repeated until a request to initiate communication between the mobile communications device and the radio telecommunications system is received.

9. The method according to claim 8, wherein the steps of detecting the control channels, determining whether the control channels are associated with an authorized or an unauthorized service provider and storing the authorization code are repeated at a predetermined rate until a request to initiate communication between the mobile communications device and the radio telecommunications system is received.

10. The method according to claim 9, wherein the predetermined rate is one repetition every 10 to 15 seconds.

11. A method for managing communication between a mobile communications device and a radio telecommunications system having an authorized service provider and an unauthorized service provider, each service provider having a control channel associated therewith and each control channel having a frequency associated therewith, the method comprising the steps of:

detecting the frequency of control channels received by the mobile communications device;

determining whether the control channels received by the mobile communications device are associated with an authorized or an unauthorized service provider;

storing the frequencies of the control channels received by the mobile communications device and an authorization code representative of whether the control channels received by the mobile communications devices are associated with an authorized or an unauthorized service provider;

receiving a request to initiate communication between the mobile communications device and the radio telecommunications system;

selecting one of the control channels received by the mobile communications device to initiate communication between the mobile communications device and the radio telecommunications system;

detecting the frequency of the one of the control channels;

determining the authorization code associated with the detected frequency of the one of the control channels; and enabling communication between the mobile communications device and the radio telecommunications system only if the authorization code associated with the detected frequency of the one of the control channels is associated with an authorized service provider.

12. A mobile communications device for use with a radio telecommunications system with an authorized service provider and an unauthorized service provider, each service provider having a control channel associated therewith, the mobile communications device comprising:

a transmitter/receiver to transmit messages to and receive messages from a radio telecommunications system;

a memory selectively coupleable to the transmitter/receiver;

a programmable computational apparatus selectively coupleable to the transmitter/receiver and the memory; and a first program operating in the programmable computational apparatus to control the programmable computational apparatus (a) to detect control channels received by the mobile communications device, (b) to determine whether the control channels received by the mobile communications device are associated with an authorized or an unauthorized service provider, (c) to store an authorization code representative of whether the control channels received by the mobile communications devices are associated with an authorized or an unauthorized service provider, (d) in response to a request to initiate communication between the mobile communications device and the radio telecommunications system, to select one of the control channels received by the mobile communications device to initiate communication between the mobile communications device and the radio telecommunications system, (e) to determine the authorization code associated with the one of the control channels, and (f) to enable communication between the mobile communications device and the radio telecommunications system only if the authorization code associated with the one of the control channels is associated with an authorized service provider.

13. The mobile communications device according to claim 12, each control channel having an identification code associated therewith, wherein:

the memory has a site in which identification codes are stored for an authorized service provider and an unauthorized service provider; and the first program operates in the programmable computational apparatus to control the programmable computational apparatus to detect the identification code of the control channels received by the mobile communications device, and, in determining whether the control channels received by the mobile communications device are associated with an authorized or an unauthorized service provider, to compare the stored identification codes with the detected identification codes.

14. The mobile communications device according to claim 12, wherein the first program operates in the programmable computational apparatus to control the programmable computational apparatus, in enabling communication between the mobile communications device and the radio telecommunications system, to control the transmitter/receiver to send a request for a voice channel on the one of the control channels only if the authorization code associated with the one of the control channels is associated with an authorized service provider, and, in response to a voice channel allocation message from an authorized service provider, to control the transmitter/receiver to send a message on an allocated voice channel to the authorized service provider.

15. The mobile communications device according to claim 12, further comprising:

an input/output assembly selectively coupleable to the programmable computational apparatus to provide a first program disable signal; and a second program operating in the programmable computational apparatus to control the programmable computational apparatus in the alternative to the first program in response to the input/output assembly providing the first program disable signal to the programmable computational device, the second program operating in the programmable computational apparatus to control the programmable computational apparatus (a) in response to a request to initiate communication between the mobile communication device and the radio telecommunication system, to select one of the control channels received by the mobile communication device to initiate communication between the mobile communications device and the radio telecommunications system, and (b) to enable communication between the mobile communications device and the radio telecommunications system regardless of whether the control channel is associated with an authorized or an unauthorized service provider.

16. The mobile communications device according to claim 12, further comprising an input/output assembly selectively coupleable to the programmable computational apparatus to display a message to a user of the mobile communications device, wherein the first program operates the programmable computational apparatus to control the programmable computational apparatus to provide an origination request failed message to the input/output assembly to be displayed thereon only if communication is not enabled between the mobile communications device and the radio telecommunications system.

* * * * *